Sept. 11, 1951  F. GREEN ET AL  2,567,169
REARVIEW MIRROR
Filed June 20, 1949
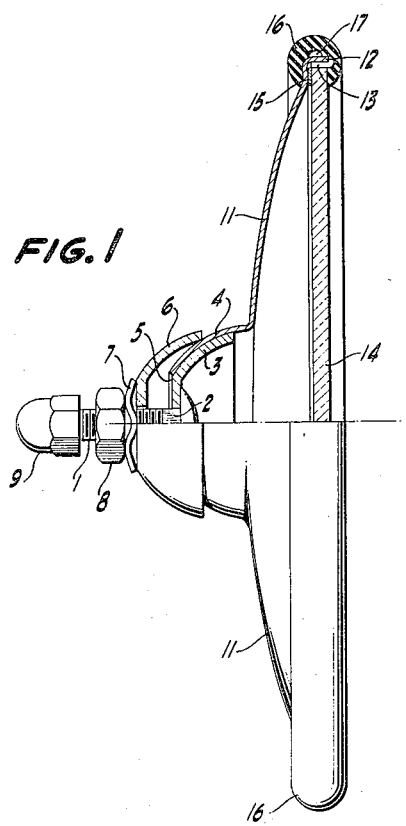
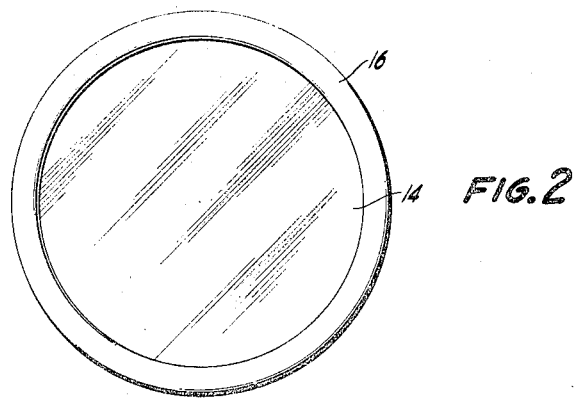
INVENTORS
FRED GREEN
WILLIAM O. HORNE
BY
Mellin & Hanscom
ATTORNEYS

Patented Sept. 11, 1951

2,567,169

UNITED STATES PATENT OFFICE 2,567,169

REARVIEW MIRROR

Fred Green and William O. Horne, Los Angeles, Calif., assignors to S & M Lamp Co., Los Angeles, Calif., a corporation of California Application June 20, 1949, Serial No. 100,138

2 Claims. (Cl. 287—12)

This invention relates to and in general has for its object the provision of a vehicle rear view mirror assembly.

More specifically, the object of this invention is the provision of a rear view mirror assembly including a mirror frame merging at its rear face into a central, generally hemispherical and rearwardly extending socket arranged to be seated and rotate on a fixed cup and including a fixed clamping cup arranged to frictionally engage the outer surface of said socket thereby to hold it in any adjusted position.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Fig. 1 is a side elevation, partly in section, of a rear view mirror embodying the objects of my invention;

Fig. 2 is a front elevation of the mirror assembly shown in Fig. 1.

The assembly as illustrated in these figures includes a bolt 1 provided with a square shank portion 2 immediately adjacent its head and arranged to be mounted on a vehicle. Snugly mounted on the square shank portion 2 is a hemispherical front cup 3 and seated on this cup for limited universal movement thereon is a hemispherical socket 4 having a central opening 5 of a diameter considerably larger than the diameter of the bolt 1. Disposed at the rear of the socket 4 is a rear cup 6 identical in all respects with the front cup 3 and which consequently is formed on an internal radius slightly smaller than the external radius of the socket 4. Backing the rear cup 6 is a spring washer 7 and threaded on the end of the bolt 1 are nuts 8 and 9, the former serving to clamp the socket 4 resiliently between the front and rear cups under any desired pressure and the two nuts serving to lock the bolt to any suitable bracket.

Formed integral and merging with the socket 4 is a dished mirror shield 11 provided with an outwardly turned rim 12. The rim 12 is formed with four tabs 13 spaced 90° apart and folded under the rim to form a four point support for a mirror 14. Disposed between the rear face of the mirror and the shield 11 is an annular gasket 15 and stretched over this assembly is rubber rim 16 provided with an internal channel 17. The rim 16 serves the dual function of resiliently holding the mirror against the gasket 15 and of cushioning the mirror and shield assembly against any accidental impacts.

By making the clamping cups identical an economy in construction is effected and since the inner radius of these cups is slightly smaller than the outer radius of the shield socket 4, they serve to grip the socket under any desired pressure or friction so as to insure that the mirror will be held in any selected position. The four point support for the mirror effected by the folded tabs 13 serves to compensate for inaccuracies in the rim 11 and obviate the necessity of accurately forming it. Finally, and as already indicated the outer rubber rim serves as a guard or buffer as well as a means for resiliently holding the mirror against the gasket 15. The resulting structure is therefore simple, practical and economical.

We claim:

1. A rear view mirror mounting assembly comprising: a bolt; identical front and rear hemispherical cups snugly mounted on said bolt; a hemispherical socket mounted on said bolt between said cups and in surface engagement with one of said cups, the inner radius of the other cup being slightly smaller than the outer radius of said socket; a spring washer mounted on said bolt behind said rear cup; a nut threaded on said bolt behind said spring washer; and a dished mirror shield formed integral and merging with said socket.

2. A rear view mirror mounting assembly comprising: a bolt; identical front and rear hemispherical cups snugly mounted on said bolt; a hemispherical socket mounted on said bolt between said cups and in surface engagement with one of said cups, said socket having a center aperture of a diameter substantially greater than the diameter of said bolt and the inner radius of the other cup being slightly smaller than the outer radius of said socket; a spring washer mounted on said bolt behind said rear cup; a nut threaded on said bolt behind said spring washer; and a dished mirror shield formed integral and merging with said socket.

FRED GREEN.
WILLIAM O. HORNE.

REFERENCES CITED

The following references are of record in the file of this patent:

UNITED STATES PATENTS

| Number | Name | Date |
| --- | --- | --- |
| 1,446,164 | D'Eyraud | Feb. 20, 1923 |
| 1,893,245 | Ritz Woller | Jan. 3, 1933 |
| 2,248,833 | Thibault et al. | July 8, 1941 |
| 2,436,678 | Somers | Feb. 24, 1948 |
| 2,500,784 | Anderson, Jr. | Mar. 14, 1950 |

FOREIGN PATENTS

| Number | Country | Date |
| --- | --- | --- |
| 512,812 | Great Britain | Sept. 26, 1939 |